US010936317B2

United States Patent
Anderson et al.

(10) Patent No.: US 10,936,317 B2
(45) Date of Patent: Mar. 2, 2021

(54) STREAMING ADDRESS GENERATION (71) Applicant: TEXAS INSTRUMENTS INCORPORATED, Dallas, TX (US)

(72) Inventors: Timothy David Anderson, University Park, TX (US); Duc Quang Bui, Grand Prairie, TX (US); Joseph Zbiciak, San Jose, CA (US); Sahithi Krishna, Plano, TX (US); Soujanya Narnur, Austin, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/422,324

(22) Filed: May 24, 2019

(65) Prior Publication Data
US 2020/0371789 A1  Nov. 26, 2020

(51) Int. Cl.
*G06F 12/02* (2006.01)
*G06F 9/30* (2018.01)
*G06F 12/0811* (2016.01)

(52) U.S. Cl.
CPC ........ *G06F 9/3016* (2013.01); *G06F 9/30065* (2013.01); *G06F 9/30098* (2013.01); *G06F 12/0811* (2013.01)

(58) Field of Classification Search
None
See application file for complete search history.

(56) References Cited

U.S. PATENT DOCUMENTS

| | | | | |
|---|---|---|---|---|
| 6,311,260 | B1* | 10/2001 | Stone | G06F 9/383 |
| | | | | 711/137 |
| 6,771,196 | B2* | 8/2004 | Hsiun | G06F 9/3861 |
| | | | | 341/106 |
| 7,177,985 | B1* | 2/2007 | Diefendorff | G06F 12/0862 |
| | | | | 711/118 |
| 7,573,779 | B2* | 8/2009 | Kanasugi | G11C 5/14 |
| | | | | 365/221 |
| 7,792,144 | B2* | 9/2010 | Rodgers | H04N 21/42615 |
| | | | | 370/466 |
| 9,025,933 | B2* | 5/2015 | Hattori | H04N 13/183 |
| | | | | 386/246 |
| 9,606,803 | B2* | 3/2017 | Anderson | G06F 9/30112 |
| 10,678,766 | B2* | 6/2020 | Clapham | H04L 43/04 |
| 2007/0106883 | A1* | 5/2007 | Choquette | G06F 9/3816 |
| | | | | 712/225 |
| 2018/0285254 | A1* | 10/2018 | Baum | G06F 13/1663 |
| 2018/0314629 | A1* | 11/2018 | Chen | G11C 7/1012 |
| 2019/0012350 | A1* | 1/2019 | Sindhu | G06F 9/5027 |

* cited by examiner

*Primary Examiner* — Cheng Yuan Tseng
(74) *Attorney, Agent, or Firm* — Charles F. Koch; Charles A. Brill; Frank D. Cimino (57) ABSTRACT

A digital signal processor having at least one streaming address generator, each with dedicated hardware, for generating addresses for writing multi-dimensional streaming data that comprises a plurality of elements. Each at least one streaming address generator is configured to generate a plurality of offsets to address the streaming data, and each of the plurality of offsets corresponds to a respective one of the plurality of elements. The address of each of the plurality of elements is the respective one of the plurality of offsets combined with a base address.

18 Claims, 9 Drawing Sheets

```
for (int i5 = 0; i5 < ICNT5; i5++) {                            45
    i5_offset = current_offset;
    for (int i4 = 0; i4 < ICNT4; i4++) {                        44
        i4_offset = current offset;
        for (int i3 = 0; i3 < ICNT3; i3++) {                    43
            i3_offset = current_offset;
            for (int i2 = 0; i2 < ICNT2; i2++) {                42
                i2_offset = current_offset;
                for int i1 = 0; i1 < ICNT1; i1++) {             41
                    i1_offset = current_offset;
                    for (int i0 = 0; i0 < ICNT0; i0 += VECLEN) {
                        current_offset += VECLEN;
                        sa_offset = current_offset;

if ((ICNT0 - i0) < _VECLEN) {
                            pred = (1 << (ICNT0 - i0)) - 1;
                        } else {
                            pred = (1 << VECLEN) -1;}

}//end i0                                   40
                    current_offset = i1_offset + DIM1;
                }//end i1
                current_offset = i2_offset + DIM2;
            }//end i2
            current_offset = i3_offset + DIM3;
        }//end i3
        current_offset = i4_offset + DIM4;
    }//end i4
    current_offset = i5_offset + DIM5;
}//end i5
```

| 511 | | 448 447 | 416 415 | 384 383 | 352 351 | 320 319 | 288 287 | 256 |
|---|---|---|---|---|---|---|---|---|
| | FLAGS[63:0] | | RESERVED | DIM5 | DIM4 | DIM3 | DIM2 | DIM1 |

| 255 | 224 223 | 192 191 | 160 159 | 128 127 | 96 95 | 64 63 | 32 31 | 0 |
|---|---|---|---|---|---|---|---|---|
| DECDIM2_WIDTH | DECDIM1_WIDTH | ICNT5 | ICNT4 | ICNT3 | ICNT2 | ICNT1 | ICNT0 |

FIG. 7

| 63 | 58 57 | 56 55 | 53 52 | 51 50 | 48 47 | 32 |
|---|---|---|---|---|---|---|
| RESERVED | DEC_DIM2SD | DEC_DIM2 | DEC_DIM1SD | DEC_DIM1 | RESERVED | |

| 31 | 27 26 | 24 23 | 15 14 | 12 11 | 0 |
|---|---|---|---|---|---|
| RESERVED | DIMFMT | RESERVED | VECLEN | RESERVED | |

FIG. 8

| 511 | 480 479 | 448 447 | 416 415 | 384 383 | 352 351 | 320 319 | 288 287 | 256 |
|---|---|---|---|---|---|---|---|---|
| DECDIM2_CNT | DECDIM1_CNT | CNT5 | CNT4 | CNT3 | CNT2 | CNT1 | CNT0 |

| 255 | 224 223 | 192 191 | 160 159 | 128 127 | 96 95 | 64 63 | 32 31 | 0 |
|---|---|---|---|---|---|---|---|---|
| DECDIM2SD_CNT | DECDIM1SD_CNT | I5 OFFSET | I4 OFFSET | I3 OFFSET | I2 OFFSET | I1 OFFSET | CURRENT OFFSET |

STREAMING ADDRESS GENERATION

BACKGROUND

Modern digital signal processors (DSP) faces multiple challenges. Workloads continue to increase, requiring increasing bandwidth. Systems on a chip (SOC) continue to grow in size and complexity. Memory system latency severely impacts certain classes of algorithms. As transistors get smaller, memories and registers become less reliable. As software stacks get larger, the number of potential interactions and errors becomes larger. Even conductive traces on circuit boards and conductive pathways on semiconductor dies become an increasing challenge. Wide busses are difficult to route. Signal propagation speeds through conductors continue to lag transistor speeds. Routing congestion is a continual challenge.

In many DSP algorithms, such as sorting, fast Fourier transform (FFT), video compression and computer vision, data are processed in terms of blocks. Therefore, the ability to generate both read and write access patterns in multi-dimensions is helpful to accelerate these algorithms. Multi-dimensional address computation, however, is complex and normally requires several instructions and execution units to perform.

SUMMARY

One example implementation described herein includes a digital signal processor. The digital signal processor comprises a streaming address generator with dedicated hardware configured to generate a plurality of offsets to address streaming data that includes a plurality of elements. Each of the plurality of offsets corresponds to a respective one of the plurality of elements. The address of each of the plurality of elements is the respective one of the plurality of offsets combined with a base address. Another example implementation described herein includes a digital signal processor system. The digital signal processor system comprises a cache and a digital signal processor. The digital signal processor comprises a central processing unit (CPU). The CPU comprises a streaming address generator with dedicated hardware configured to generate a plurality of offsets to address streaming data for writing to or reading from the cache. The streaming data comprises a plurality of elements and each of the plurality of offsets corresponds to a respective one of the plurality of elements.

Another example implementation described herein includes a method of operating a digital signal processor system configured for addressing streaming data having a plurality of elements. The method comprises receiving streaming data and processing streaming data using a first set of execution units. The method further comprises generating a plurality of offsets corresponding to the plurality of elements by using execution units that are unavailable to the step of processing streaming data. The method further comprises determining the address by combining each of the plurality of offsets with a base address.

BRIEF DESCRIPTION OF THE DRAWINGS

For a detailed description of various examples, reference will now be made to the accompanying drawings in which.

DETAILED DESCRIPTION

The recitation "based on" means "based at least in part on." Therefore, if X is based on Y, X may be a function of Y and any number of other factors.

DSPs often have 64-bit buses. More recently, some DSPs have 512-bit buses, for example the Texas Instruments C7x family of DSPs. An exemplary 512-bit DSP is the single core DSP 100 shown in FIG. 1 and described in detail in U.S. Pat. No. 9,606,803, which is incorporated by reference herein in its entirety. DSP 100 includes a vector CPU 110 coupled to separate level one instruction cache (L1I) 111 and level one data cache (L1D) 112. The DSP further includes level two cache (L2) 114, which may be a random access memory (RAM). Vector CPU 110, level one instruction cache (L1I) 111, level one data cache (L1D) 112 and level two combined instruction/data cache (L2) 114 may be formed on a single integrated circuit.

Figure 1:
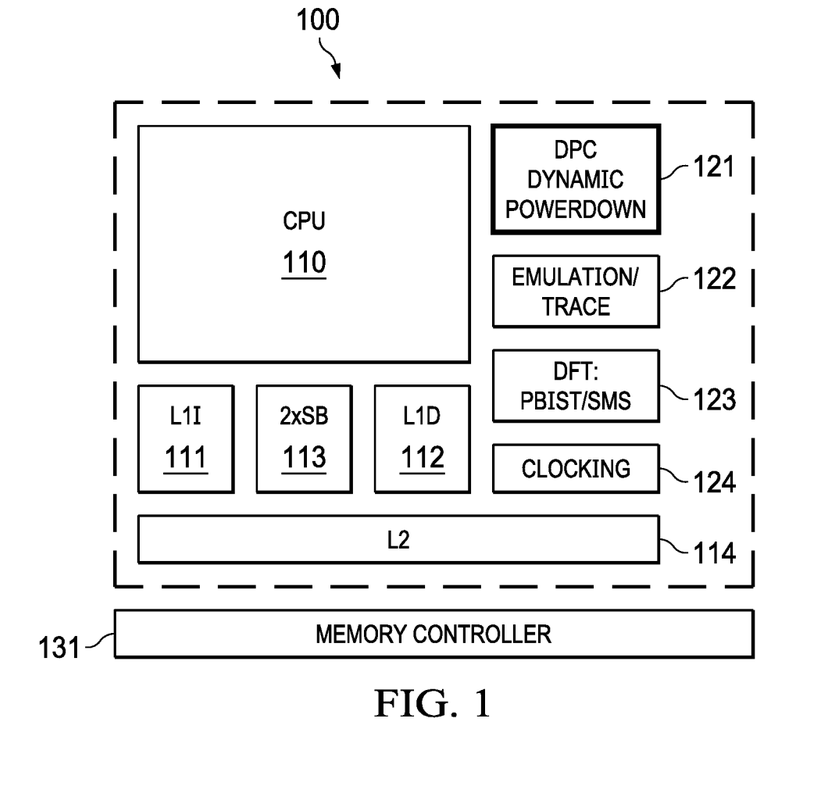
FIG. 1 illustrates a single-core DSP.

This single integrated circuit may also include auxiliary circuits such as power control circuit 121, emulation/trace circuits 122, design for test (DFT) programmable built-in self test (PBIST) circuit 123 and clocking circuit 124. External to CPU 110 and possibly integrated on single integrated circuit 100 is memory controller 131.

Figure 2:
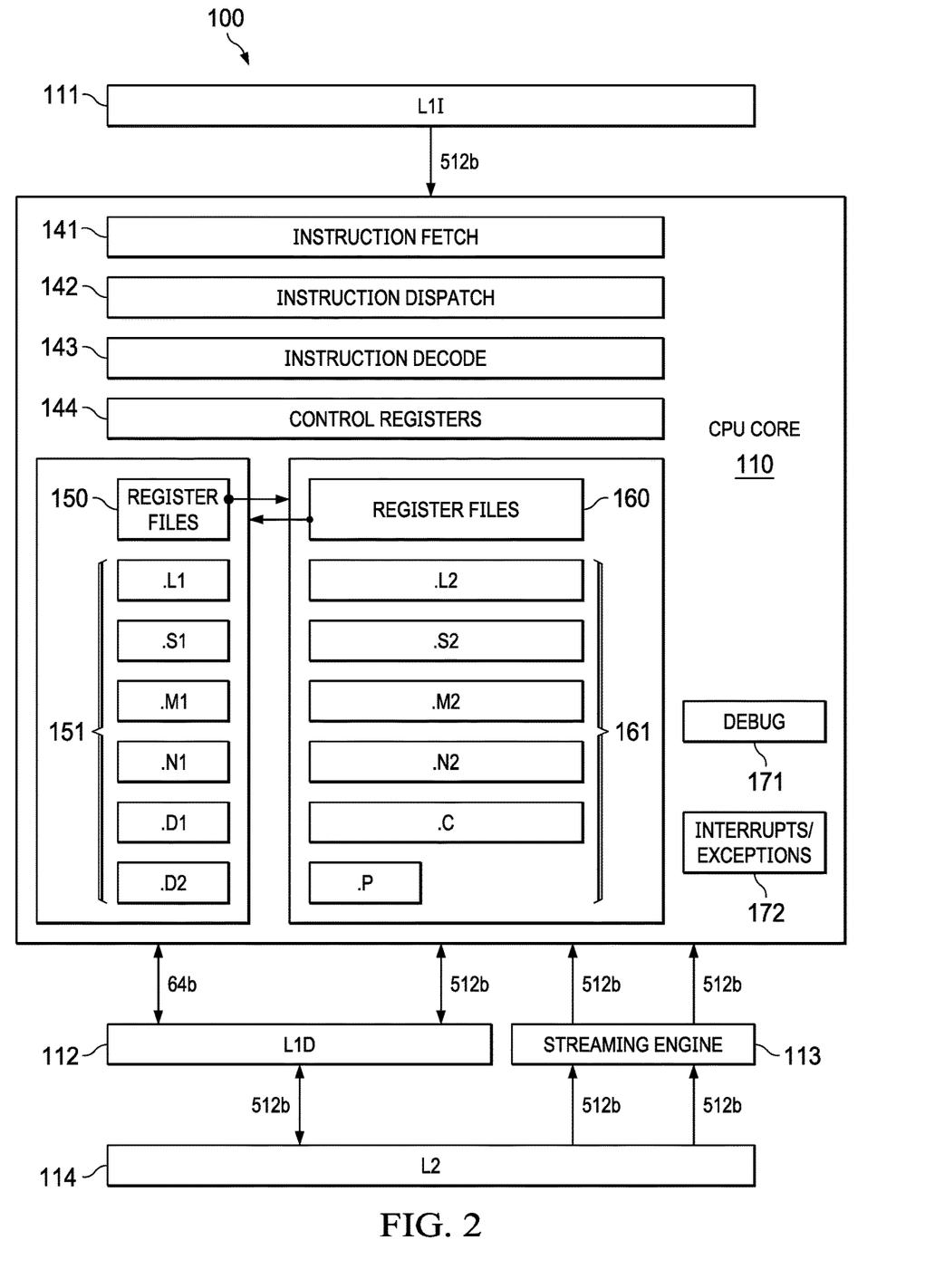
FIG. 2 illustrates further details of the single-core DSP of FIG. 1.

FIG. 2 illustrates a block diagram of at least a portion of DSP 100 having vector CPU 110. As shown in FIG. 2, vector CPU 110 includes instruction fetch unit 141, instruction dispatch unit 142, instruction decode unit 143, and control registers 144. Vector CPU 110 further includes 64-bit register files 150 and 64-bit functional units 151 for receiving and processing 64-bit scalar data from level one data cache (L1D) 112. Vector CPU 110 also includes 512-bit register files 160 and 512-bit functional units 161 for receiving and processing 512-bit vector data from level one data cache (L1D) 112 and/or from streaming engine 113. DSP 100 also includes level two combined instruction/data cache (L2) 114, which sends and receives data from level one data cache (L1D) 112 and sends data to streaming engine 113. Vector CPU 110 may also include debug unit 171 and interrupt logic unit 172.

As described in U.S. Pat. No. 9,606,803, incorporated by reference herein in its entirety, a streaming engine such as streaming engine 113 may increase the available bandwidth to the CPU, reduces the number of cache misses, reduces scalar operations and allows for multi-dimensional memory access. While Vector CPU 110 has a substantially increased bandwidth for consuming data and can accommodate multi-dimensional memory access at least in part due to streaming engine 113, it lacks a similarly increased bandwidth for writing streaming data from the CPU, resulting in a bottleneck for streaming operations. In addition, the number of address calculations required for writing streaming data consumes substantial execution units that are needed for other operations. Indeed, address generation for multi-dimensional data may require a functional unit for each dimension, which may be more functional units than a CPU has.

Examples described below address at least some of these issues, at least in part, by having dedicated hardware which automatically generates streaming addresses as offsets and allows the multi-dimensional load or store access to be fully pipelined.

Figure 3:
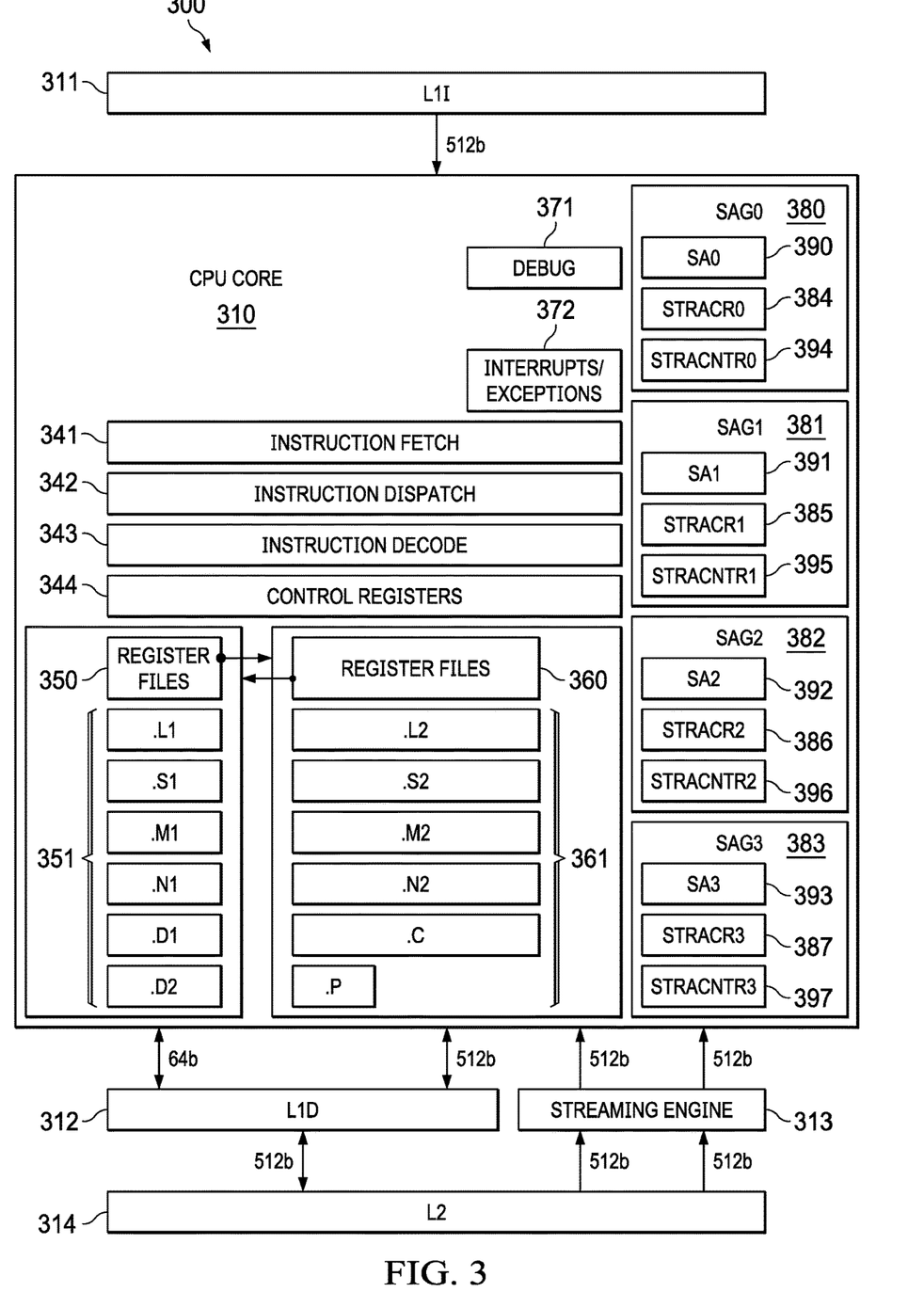
FIG. 3 illustrates a DSP with streaming address generators.

FIG. 3 illustrates a block diagram of at least a portion of a DSP 300 and its interaction with level two combined instruction/data cache (L2) 314. As shown in FIG. 3, vector CPU 310 includes instruction fetch unit 341, instruction dispatch unit 342, instruction decode unit 343, and control registers 344. Vector CPU 310 further includes 64-bit register files 350 and 64-bit functional units 351 for receiving and processing 64-bit scalar data from level one data cache (L1D) 312. Vector CPU 310 also includes 512-bit register files 360 and 512-bit functional units 361 for receiving and processing 512-bit vector data from level one data cache (L1D) 312 and/or from streaming engine 313. DSP 300 also includes level two combined instruction/data cache (L2) 314, which sends and receives data from level one data cache (L1D) 312 and sends data to streaming engine 313. Vector CPU 310 may also include debug unit 371 and interrupt logic unit 372.

DSP 300 differs from DSP 100 (FIGS. 1 and 2) primarily in that CPU 310 of DSP 300 includes streaming address generators SAG0 380, SAG1 381, SAG2 382, SAG3 383. While FIG. 3 shows that CPU 310 has four streaming address generators SAG0 380, SAG1 381, SAG2 382, SAG3 383, CPU 310 may include one, two, three or four streaming address generators and, in some other examples, more than four. While the address calculation logic of the streaming engine 313 performs multi-dimensional address calculations to provide streaming data into CPU 310, the streaming address generators SAG0 380, SAG1 381, SAG2 382, SAG3 383 perform multi-dimensional address calculations to be used as offsets for addresses for store instructions in the CPU 310. Alternatively, one or more of SAG0 380, SAG1 381, SAG2 382, SAG3 383 may also be used in place of, or in conjunction with, the streaming engine 313 to generate addresses for load instructions.

Offsets generated by streaming address generators 380, 381, 382, 383 are stored in streaming address offset registers SA0 390, SA1 391, SA2 392 and SA3 393, respectively. Each streaming address generator SAG0 380, SAG1 381, SAG2 382, SAG3 383 includes a respective streaming address control register STRACR0 384, STRACR1 385, STRACR2 386, STRACR3 387 and a respective streaming address count register STRACNTR0 394, STRACNTR1 395, STRACNTR2 396, STRACNTR3 397. As explained in more detail below, the streaming address control registers STRACR0 384, STRACR1 385, STRACR2 386, STRACR3 387 contain configuration information for the respective streaming address generator, and the streaming address count registers STRACNTR0 394, STRACNTR1 395, STRACNTR2 396, STRACNTR3 397 store runtime information used by the respective streaming address generator.

When using a streaming address generator, the full address is calculated by, for example, adding the base value with the offset generated by the streaming address generator. The streaming address generators SAG0-SAG3 support address calculation mode of forward linear stream, and start at an offset of 0. Examples of addressing described herein use multi-level nested loops to iteratively generate offsets for multi-dimensional data using a small number of parameters. The programs access those offsets through the streaming address offset registers SA0 390, SA1 391, SA2 392 and SA3 393.

Table 1 lists the parameters of a multi-dimensional stream.

TABLE 1

| Parameter | Definition |
|---|---|
| ICNT0 | Number of iterations for the innermost loop level 0. At loop level 0, all elements are physically contiguous. DIM0 = 1. In Data Strip Mining Mode, ICNT0 is used as the initial total "actual width" of the frame. |
| ICNT1 | Number of iterations for loop level 1 |
| DIM1 | Number of elements between consecutive iterations of loop level 1 |
| ICNT2 | Number of iterations for loop level 2 |
| DIM2 | Number of elements between consecutive iterations of loop level 2 |
| ICNT3 | Number of iterations for loop level 3 |
| DIM3 | Number of elements between consecutive iterations of loop level 3 |
| ICNT4 | Number of iterations for loop level 4 |
| DIM4 | Number of elements between consecutive iterations of loop level 4 |
| ICNT5 | Number of iterations for loop level 5 |
| DIM5 | Number of elements between consecutive iterations of loop level 5 |

Figure 4:
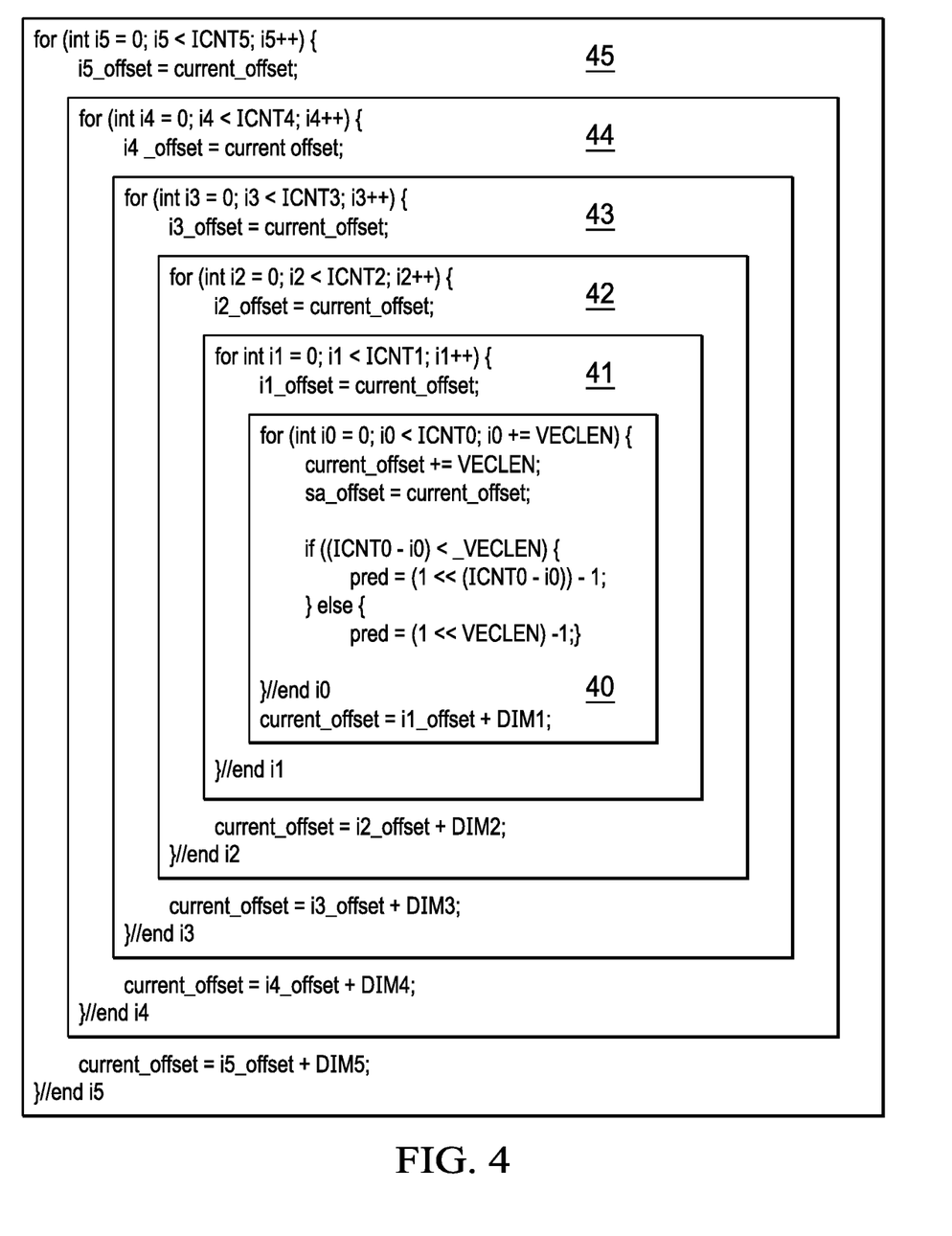
FIG. 4 illustrates exemplary logic used by the streaming address generator.

FIG. 4 shows the logic used by the streaming address generator for calculating the offsets of a 6-level forward loop. VECLEN specifies the number of elements per fetch. The iteration count ICNT0, ICNT1, ICNT2, ICNT3, ICNT4, ICNT5 for a loop level indicates the number of times that level repeats. The dimension DIM0, DIM1, DIM2, DIM3, DIM4, DIM5, indicates the distance between pointer positions for consecutive iterations of the respective loop level.

In the example logic in FIG. 4, the innermost loop 40 (referred to as loop 0) computes the offsets of physically contiguous elements from memory. Because the elements are contiguous and have no space between them, the dimension of loop 0 is always 1 element, so there may be no dimension (DIM) parameter defined for loop 0. The pointer itself moves from element to element in consecutive, increasing order. In each level outside the inner loop (41, 42, 43, 44, 45), the loop moves the pointer to a new location based on the size of that loop level's dimension (DIM). The inner most loop 40 also includes logic for vector predication, which is described in detail in a U.S. Patent Application entitled, "System and Method for Predication Handling" (hereinafter "the Predication application"), filed concurrently herewith and incorporated by reference herein.

Figure 5:
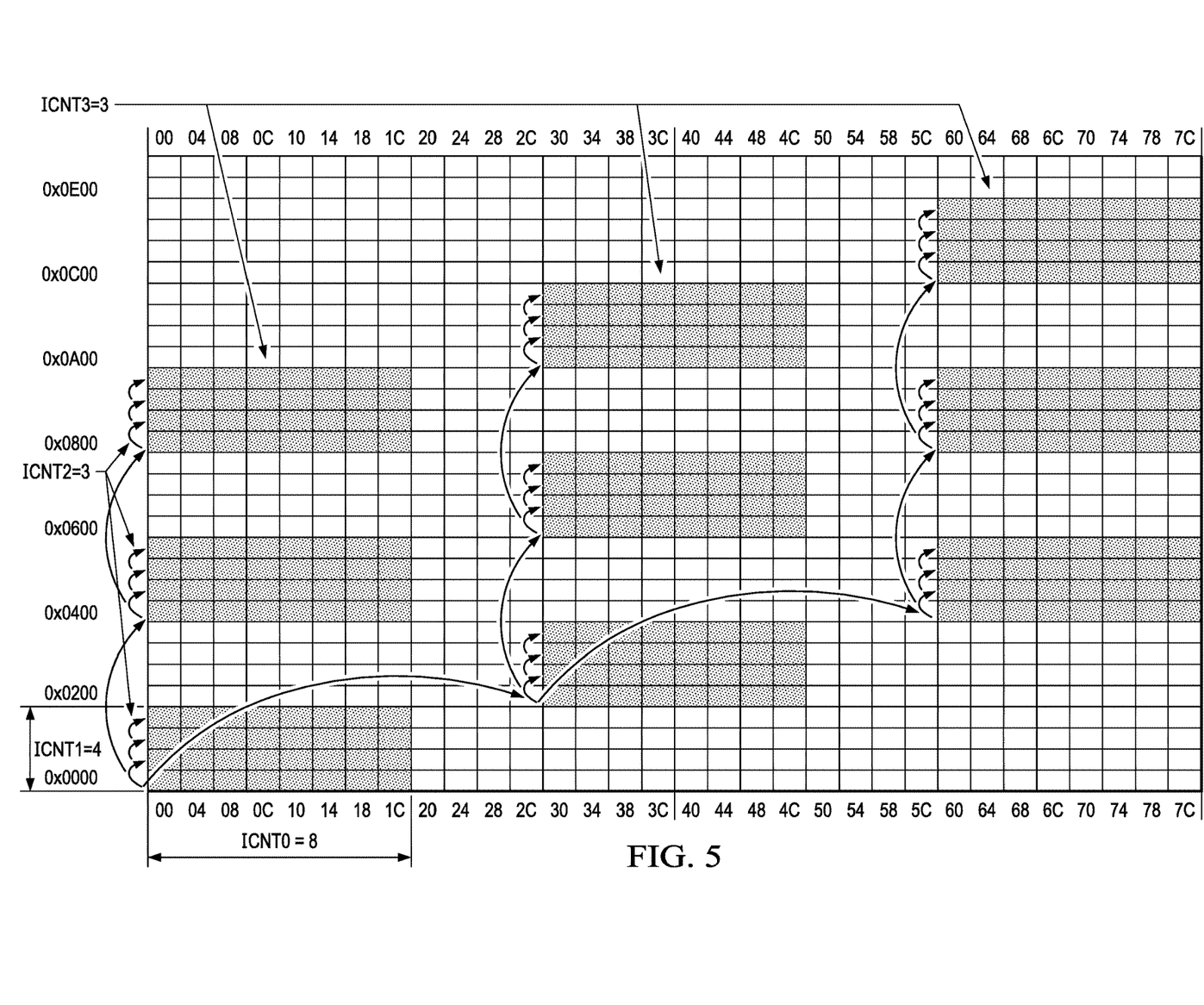
FIG. 5 illustrates an exemplary 4-dimensional memory pattern.

FIG. 5 shows an example of a 4-dimension memory address pattern. In the example in FIG. 5, the addressing parameters have the following values:
ICNT0=8
ICNT1=4
ICNT2=3
ICNT3=3
DIM1=0x080
DIM2=0x400
DIM3=0x230

As shown in FIG. 5, the innermost loop (loop 0) has ICNT0=8 and is shown by each row having 8 elements. Since the implicit dimension is 1 element, the bytes in each row are contiguous. The next loop (loop 1) has ICNT1=4 and is shown by loop 0 rows in groups of 4, each row separated by DIM1. The next loop (loop 2) has ICNT2=3 and is shown by three grouping of the 4 rows from loops 0 and 1, each grouping separated by DIM2. The final loop (loop 3) has ICNT3=3 shown by 3 of the groupings from loops 0-2, each grouping separated by DIM3.

CPU 310 exposes the streaming address generator to programs through a small number of instructions and specialized registers.

The stream open instruction SAOPEN starts a new address generation sequence for the specified streaming address generator 380, 381, 382, 383. Once the SAOPEN instruction is executed, any load or store instructions (discussed below) with the proper addressing mode, as discussed in more detail in a U.S. Patent Application entitled, "System and Method for Addressing Data in Memory," filed concurrently herewith and incorporated by reference herein, and the offset register field value of 0-3 will use the offset value calculated by the corresponding streaming address generator SAG0, SAG1, SAG2, SAG3.

The operands for the SAOPEN instruction are, for example, a register value containing configuration template information and a stream identifier. Upon executing SAOPEN, the register value is copied into the corresponding streaming address control register to be used as the addressing template, the ICNT fields of the corresponding STRCNTR register is initialized.

The stream close instruction SACLOSE explicitly closes the specified streaming address generation operations for a given stream. Executing SACLOSE will reset the corresponding STRACR and STRACNTR registers to their default values. The streaming address generator cannot be used for addressing after the stream is closed.

The stream break instruction SABRK allows exiting early from a level of loop nest within a stream. Issuing a stream break instruction SABRK causes the streaming address generator to skip all remaining elements for the corresponding number of loop levels. "SABRK 5, SAn" will end the stream but not close it, where "5" signifies to break from loop 5 and "SAn" signifies the streaming address offset register.

Streaming address control registers STRACR0 384, STRACR1 385, STRACR2 386, STRACR3 387 contain the parameters, such as the element counts, loop dimensions, the access length and other flags, to start streaming address calculation.

Figure 6:
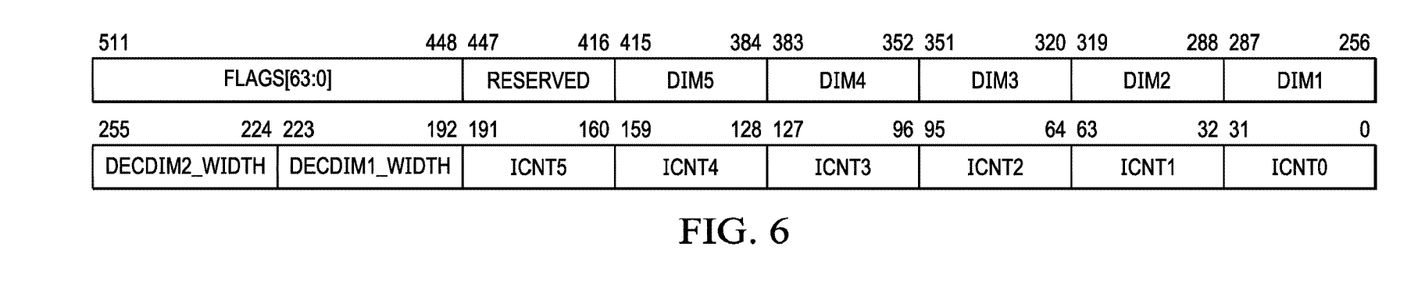
FIG. 6 illustrates an exemplary streaming address configuration register.

FIG. 6 illustrates an exemplary streaming address configuration register. Table 2 shows an example of the field definitions of the streaming address configuration register.

TABLE 2

| Field Name | Description | Size Bits |
| --- | --- | --- |
| ICNT0 | Total loop iteration count for level 0 (innermost) | 32 |
| ICNT1 | Total loop iteration count for level 1 | 32 |
| ICNT2 | Total loop iteration count for level 2 | 32 |
| ICNT3 | Total loop iteration count for level 3 | 32 |
| ICNT4 | Total loop iteration count for level 4 | 32 |

TABLE 2-continued

| Field Name | Description | Size Bits |
| --- | --- | --- |
| ICNT5 | Total loop iteration count for level 5 | 32 |
| DECDIM1_WIDTH | Tile width of DECDIM1. Use together with DECDIM1 flags to specify vertical strip mining feature | 32 |
| DECDIM2_WIDTH | Tile width of DECDIM2. Use together with DECDIM2 flags to specify vertical strip mining feature | 32 |
| DIM1 | Signed dimension for loop level 1, in elements | 32 |
| DIM2 | Signed dimension for loop level 2, in elements | 32 |
| DIM3 | Signed dimension for loop level 3, in elements | 32 |
| DIM4 | Signed dimension for loop level 4, in elements | 32 |
| DIM5 | Signed dimension for loop level 5, in elements | 32 |
| FLAGS | Stream modifier flags | 64 |

The fields in table 2 are described above. DEC_DIM1_WIDTH and DECDIM2_WIDTH help to define any vertical strip mining, which is described in more detail in the Predication application. Strip mining is also discussed in the following applications filed on May 23, 2019, each of which is incorporated by reference herein in its entirety: application Ser. No. 16/420,480, entitled "Inserting Predefined Pad Values into a Stream of Vectors," application Ser. No. 16/420,467, entitled "Inserting Null Vectors into a Stream of Vectors," application Ser. No. 16/420,457, entitled "Two-Dimensional Zero Padding in a Stream of Matrix Elements," and application Ser. No. 16/420,447, entitled "One-Dimensional Zero Padding in a Stream of Matrix Elements."

Figure 7:
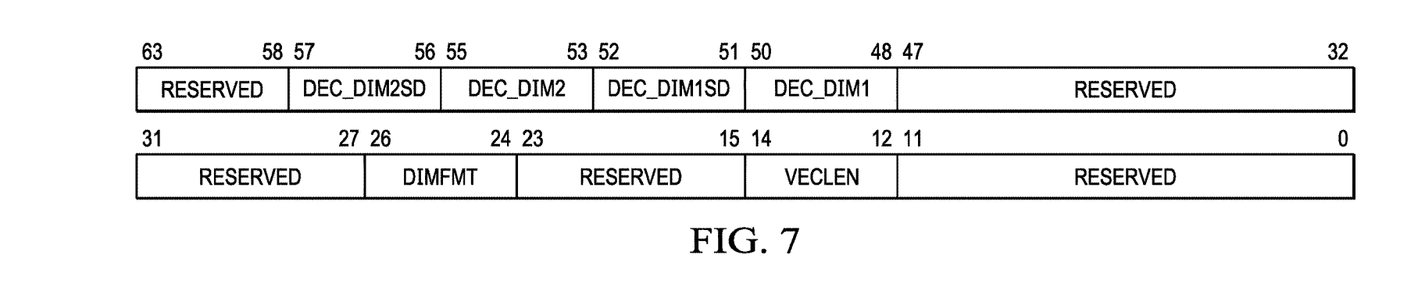
FIG. 7 illustrates exemplary sub-field definitions of the flags field of the streaming address configuration register of FIG. 7.

FIG. 7 illustrates sub-field definitions of the flags field of a streaming address configuration register.

Figure 8:
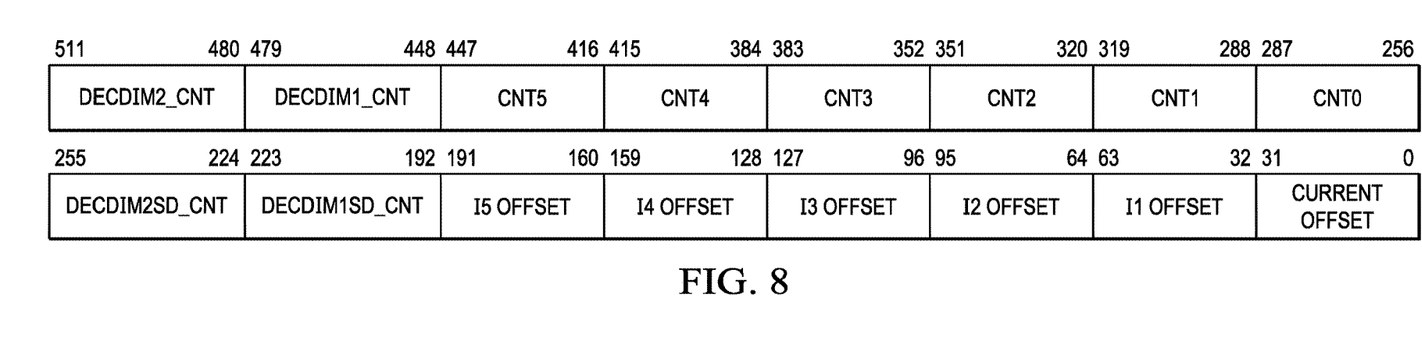
FIG. 8 illustrates an exemplary streaming address count register.

The streaming address count registers STRACNTR0 394, STRACNTR1 395, STRACNTR2 396, STRACNTR3 397 contain the intermediate element counts of all loop levels. When the element count CNT of a loop becomes zero, the address of the element of the next loop is computed using the next loop dimension. FIG. 8 illustrates an exemplary streaming address count register.

Executing a STRAOPEN instruction will set the CNT fields in STRACNTR to the values contained in the ICNT fields of the STRACR. While a stream is open, functional access to the associated STRACR and STRACNTR registers are disallowed.

Streaming load or store instructions are regular load or store instructions which use the offset generated by the streaming address generators. The address is the offset combined with a base address. Similar to regular load and store instructions, the base address can come from a global scalar register or from a D unit local register. Exemplary addressing modes that can be used with the streaming load or store instructions are described in detail in a U.S. Patent Application entitled, "System and Method for Addressing Data in Memory," filed concurrently herewith and incorporated by reference herein. By default, reading the streaming address offset registers SA0 390, SA1 391, SA2 392 and SA3 393 does not advance the offset calculations, and the register can be re-read with the same value as many time as needed. Encoding schemes can be used, however, that also advance the offset calculation by an element length, which initiates the streaming address generation logic, for example that shown in FIG. 4.

Figure 9:
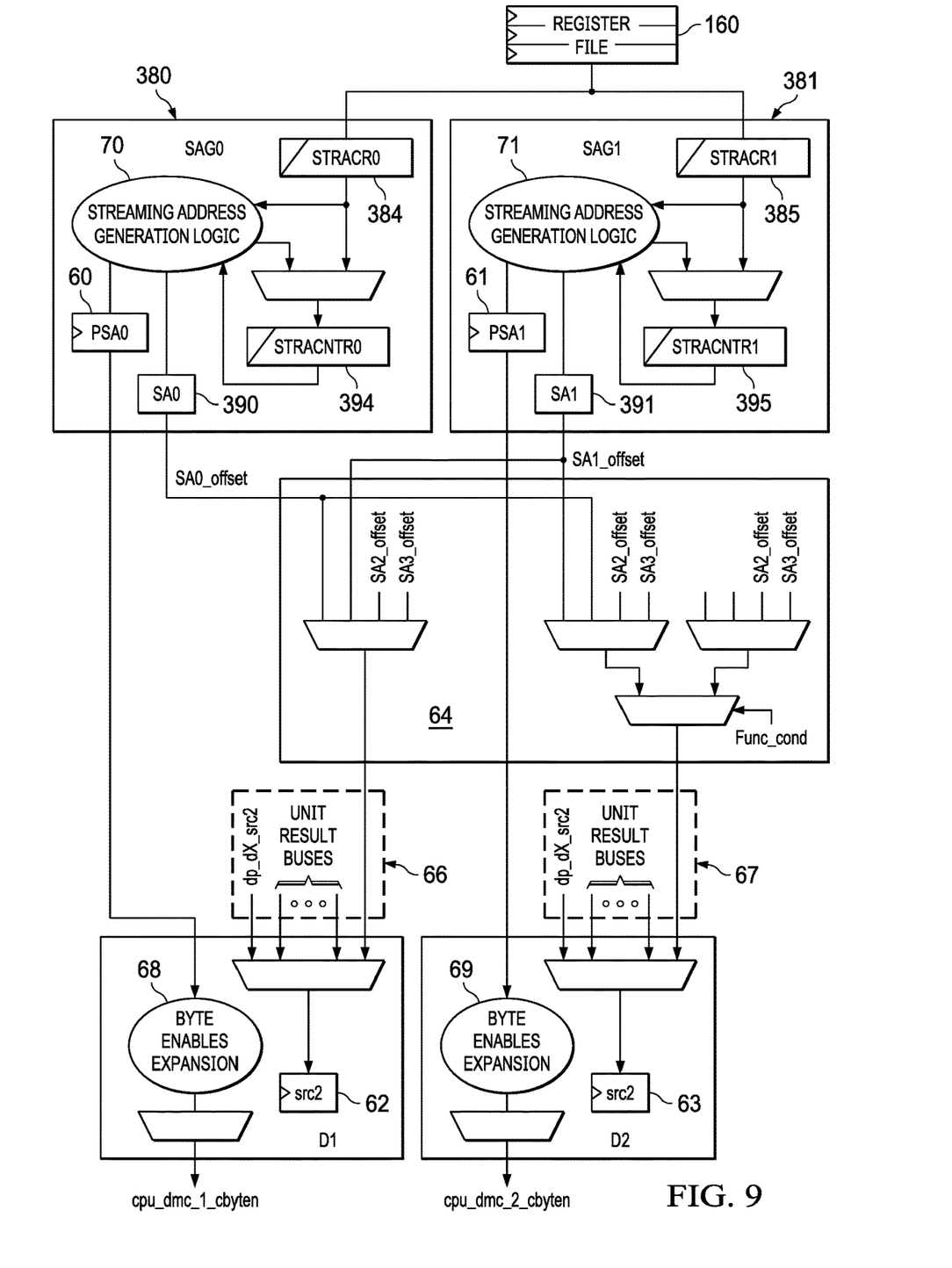
FIG. 9 illustrates an exemplary hardware implementation of the streaming address generator and associated circuitry.

FIG. 9 shows an exemplary hardware implementation of the streaming address generators SAG0 380 and SAG1 381. While streaming address generators SAG2 382 and SAG3 383 are not shown in FIG. 9 due to space constraints, FIG. 9 does contemplate that these additional streaming address generators exist. Streaming address generators SAG2 382 and SAG3 383 may be implemented in a similar manner to streaming address generators SAG0 380 and SAG1 381 shown in FIG. 9.

As shown in FIG. 9, the configuration information included in the SAOPEN instruction is stored in register file 160, and is provided to the respective streaming address control register STRACR0 384, STRACR1 385, which provide necessary information to the respective streaming address generation logic 70 and 71 and to respective streaming address count register STRACNTR0 394, STRACNTR1 395. Streaming address generation logic 70, 71 is the hardware implementation of the offset generation logic, for example that shown in FIG. 4. Streaming address count registers STRACNTR0 394, STRACNTR1 395, receive and provide information to streaming address generation logic 70, 71. The output of each streaming address generators SAG0 380 and SAG1 381 is an offset, which is stored in streaming address offset registers SA0 390 and SA1 391 and then sent to mux circuitry 64 for routing to the appropriate functional unit D1, D2 in functional units 351 (FIG. 3). The offsets may be stored as the operands in the relevant instruction 62, 63, depending on the determination of the addressing mode blocks 66, 67.

Each streaming address generator SAG0 380 and SAG1 381 may also generate a predicate for storing in respective predicate streaming address registers 60, 61, which are then expanded into byte enables in 68, 69, as described in more detail in the Predication application.

Figure 10A:
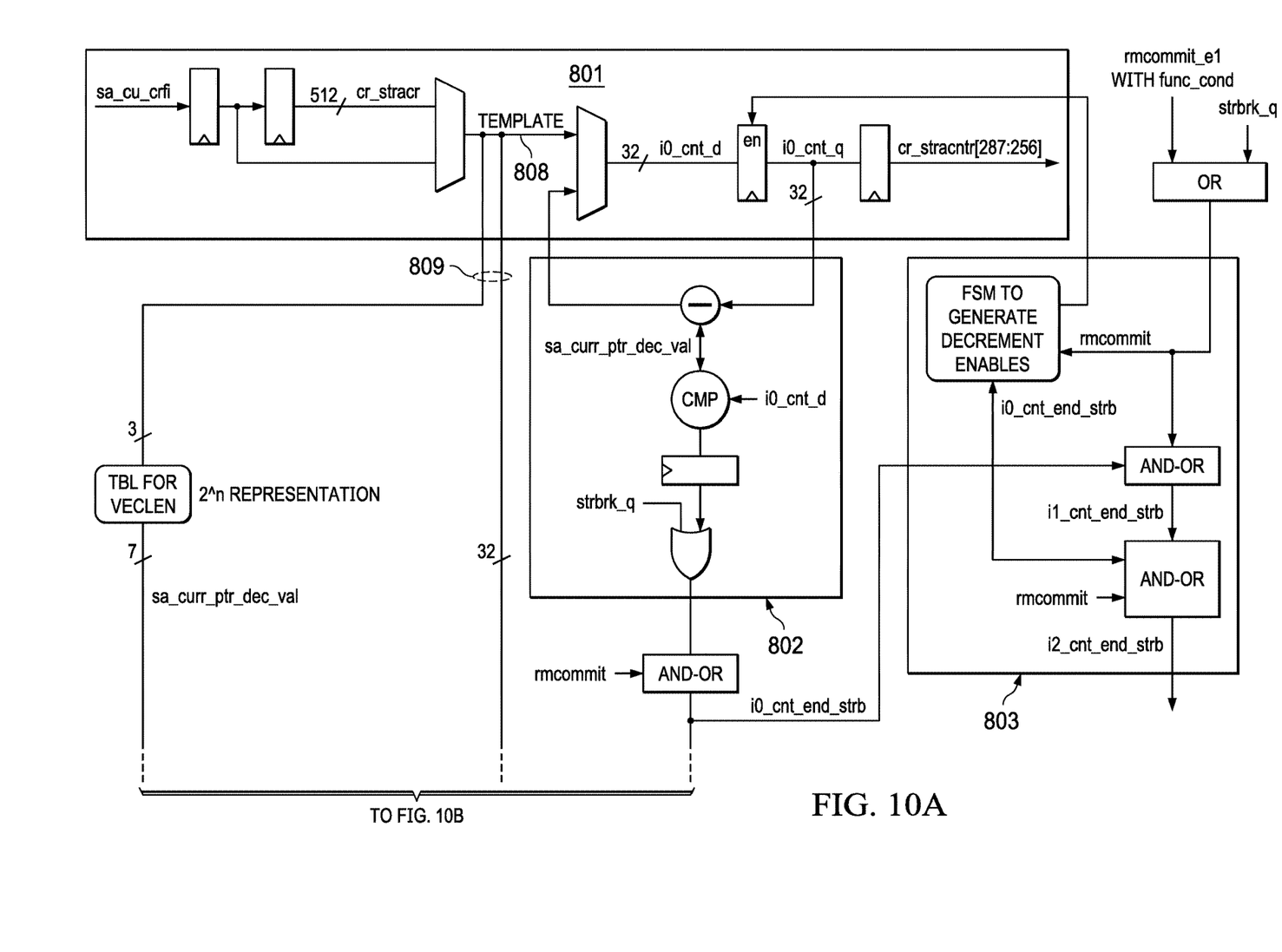
FIGS. 10A and 10B illustrate an exemplary hardware implementation of streaming address generation logic.
Figure 10B:
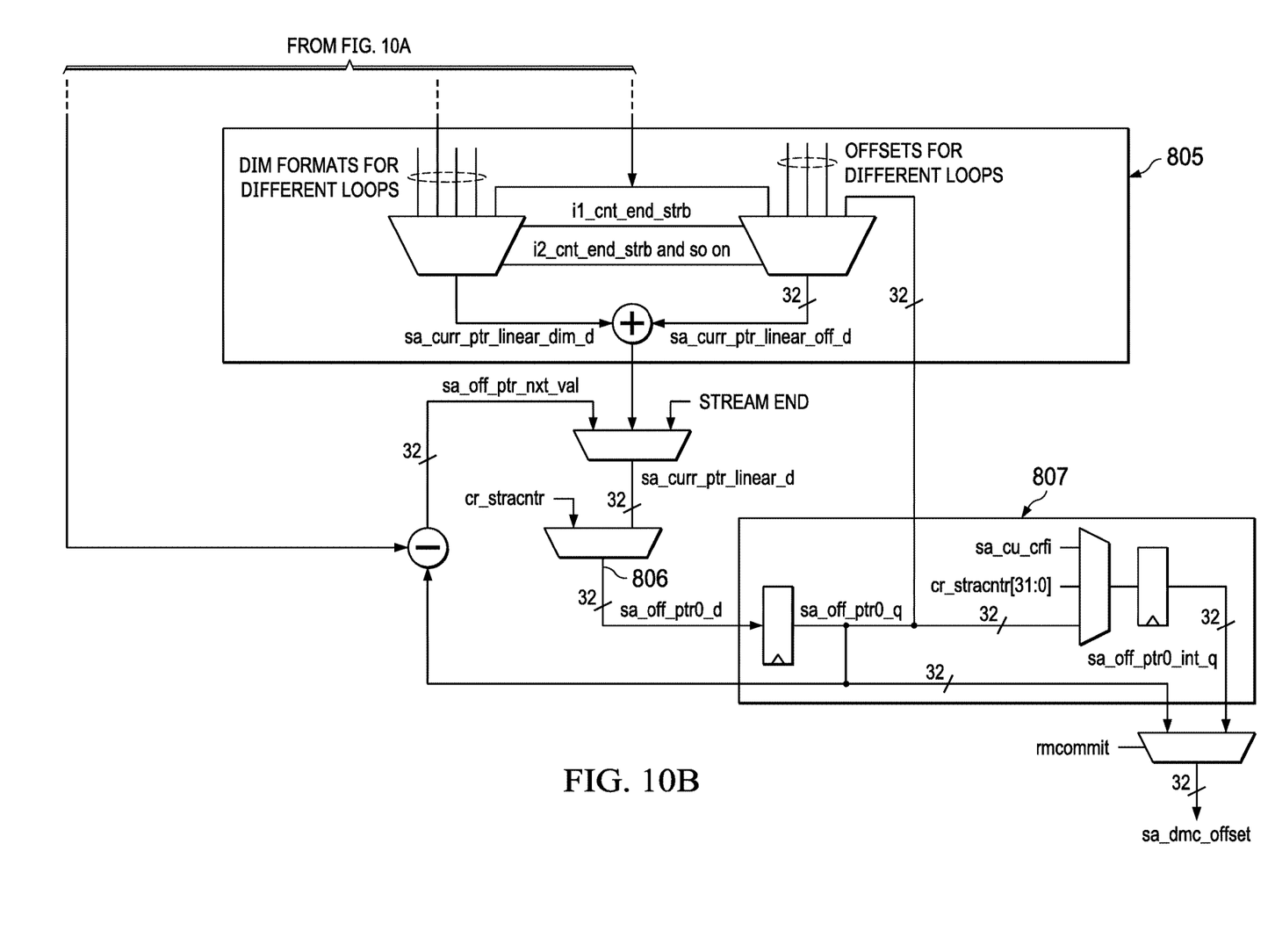

FIGS. 10A and 10B show an exemplary hardware implementation of streaming address generation logic 70 and 71 from FIG. 9. At block 801, respective streaming address control registers (e.g., STRACR0 384, STRACR1 385) provide necessary information to the respective streaming address generation logic 70 and 71 (at 809) and to respective streaming address count registers (e.g., STRACNTR0 394, STRACNTR1 395) at 808. Block 802 is an exemplary implementation of the inner-most loop 40. Block 803 iterates through the other loops 41, 42, 43, 44, 45 (FIG. 4). Block 805 calculates the current offset at the end of each loop 41, 42, 43, 44, 45 (FIG. 4). The offset is generated at 806, and stored in streaming address offset registers (e.g., SA0 390 and SA1 391) in block 807.

To initiate the streaming address generation logic, a load or store instruction may indicate that the offset is to be advanced. For example, the load or store instruction may include as an operand "[SA0++]", which tells the streaming address generator to use the value of streaming address generator register SA0 as the offset, and then advance the offset by one element size. Placing the "++" inside the brackets indicates that only the offset is to be advanced, and not the base address. Thus, the same base address can be used with an advancing offset to address multi-dimensional data.

The element size is based on the size of the data in the load or store instruction that uses the offset. The number of elements accessed is specified by the VECLEN field of the streaming address configuration registers (STRACR.VECLEN), regardless of the access size specified by the load or store instructions. The exemplary streaming address generators described herein improve performance and efficiency of address generation by performing address generation for streaming data in dedicated hardware. The address generation is separated from the data processing. Examples of a streaming address generators described herein may also use multiple base addresses with the same offsets and different element sizes. While the exemplary streaming address generators described herein include a streaming address offset register SA0 390, SA1 391, SA2 392 and SA3 393 for storing offsets generated by the respective streaming address generator, the offset may instead be output by the streaming address generator.

Modifications are possible in the described embodiments, and other embodiments are possible, within the scope of the claims.

What is claimed is:

1. A digital signal processor comprising:
   a streaming address generator with dedicated hardware configured to generate a plurality of offsets to address streaming data that comprises a plurality of elements, each of the plurality of offsets corresponding to a respective one of the plurality of elements, wherein the plurality of offsets is configured to define in memory a multi-dimensional space for the streaming data.

2. The digital signal processor of claim 1, wherein the streaming address generator is configured to generate the plurality of offsets using nested loops.

3. The digital signal processor of claim 2, wherein each of the at least one streaming address generator further comprises:
   a streaming address offset register configured to store each of the plurality of offsets;
   a streaming address control register configured to store configuration information; and
   a streaming address count register configured to store runtime information.

4. The digital signal processor of claim 3, wherein the configuration information includes a number of iterations of each loop of the nested loops and a number of elements separating the data in each loop of the nested loops.

5. The digital signal processor of claim 4, wherein the streaming address generator is configured to advance an offset of the plurality of offsets by an element length after each iteration of each loop of the nested loops.

6. The digital signal processor of claim 4, wherein an inner most loop of the nested loops writes data contiguously.

7. The digital signal processor of claim 1, further comprising a second, third and fourth streaming address generator.

8. The digital signal processor of claim 1, further comprising a central processing unit, the central processing unit comprising the streaming address generator.

9. A digital signal processor system comprising:
   a cache; and
   a digital signal processor comprising a Central Processing Unit (CPU), the CPU comprising a streaming address generator with dedicated hardware configured to generate a plurality of offsets to address streaming data for writing to or reading from the cache, the streaming data comprising a plurality of elements and each of the plurality of offsets corresponding to a respective one of the plurality of elements, wherein the plurality of offsets is configured to define in memory a multi-dimensional space for the streaming data.

10. The digital signal processor system of claim 9, wherein the streaming address generator is configured to generate the plurality of offsets using nested loops.

11. The digital signal processor system of claim 10, wherein each of the at least one streaming address generator further comprises:
   a streaming address offset register configured to store each of the plurality of offsets;
   a streaming address control register configured to store configuration information; and
   a streaming address count register configured to store runtime information.

12. The digital signal processor system of claim 11, wherein the configuration information includes a number of iterations of each loop of the nested loops and a number of elements separating the data in each loop of the nested loops.

13. The digital signal processor system of claim 12, wherein the streaming address generator is configured to advance an offset of the plurality of offsets by an element length after each iteration of each loop of the nested loops.

14. A method of operating a digital signal processor system configured for addressing streaming data having a plurality of elements, the method comprising:
   receiving the streaming data;
   generating a plurality of offsets corresponding to the plurality of elements by using a set of execution units, wherein the plurality of offsets defines a multi-dimensional space for the streaming data; and
   determining the addressing for the streaming data by combining each of the plurality of offsets with a base address.

15. The method of claim 14, wherein the generating step comprises iterating through nested loops to generate the plurality of offsets for multi-dimensional data.

16. The method of claim 15, further comprising advancing an offset of the plurality of offsets after each iteration.

17. The method of claim 14, further comprising storing each of the plurality of offsets in a streaming address offset register.

18. The method of claim 17, wherein the determining step comprises:
   sequentially retrieving each of the plurality of offsets from the streaming address offset register; and
   combining each of the plurality of offsets with the base address.

* * * * *